United States Patent [19]

Steiner et al.

[11] Patent Number: 5,542,511

[45] Date of Patent: Aug. 6, 1996

[54] APPARATUS FOR SUSPENDING AT LEAST ONE CURRENT-CARRYING CONTACT WIRE FOR CURRENT COLLECTORS OF OVERHEAD LINE BUSES OR TRAMS

[75] Inventors: Daniel Steiner, Fischbach; Willy Brassel, Dottikon; Karl Hagmann, Zürich, all of Switzerland

[73] Assignee: Kummler + Matter AG Fahrleitungstechnik, Zurich, Switzerland

[21] Appl. No.: 18,898

[22] Filed: Feb. 17, 1993

[30] Foreign Application Priority Data

Oct. 15, 1992 [DE] Germany .................. 42 34 755.6

[51] Int. Cl.[6] .................................................. B60M 1/225
[52] U.S. Cl. ........................................ 191/41; 191/42
[58] Field of Search .............................. 191/33 R, 40, 191/41, 42, 43

[56] References Cited

U.S. PATENT DOCUMENTS

| 1,735,131 | 11/1929 | Schaake | 191/40 |
| 4,658,100 | 4/1987 | Suris | 191/41 |

FOREIGN PATENT DOCUMENTS

| 77214 | 5/1949 | Czech Rep. | 191/41 |
| 77216 | 5/1949 | Czech Rep. | 191/41 |
| 614261 | 5/1935 | Germany | 191/42 |
| 0218443 | 9/1986 | Japan | 191/42 |
| 81079 | 11/1955 | Netherlands | 191/41 |
| 34045 | 3/1951 | Poland | 191/41 |
| 186137 | 1/1937 | Switzerland . | |
| 195513 | 4/1938 | Switzerland . | |
| 207177 | 12/1939 | Switzerland . | |
| 229346 | 1/1944 | Switzerland . | |
| 835227 | 5/1960 | United Kingdom | 191/41 |

Primary Examiner—David A. Bucci
Assistant Examiner—Scott L. Lowe
Attorney, Agent, or Firm—Bachman & LaPointe

[57] ABSTRACT

An apparatus for suspending at least one current-carrying contact wire for current collectors of overhead line buses or trams comprises a connecting element is fixed to a support cable. The connecting element is formed from an insulating plastic material, preferably a glass fiber-reinforced polyamide, and forms a unitary shaped body having a receiving member for a support element which is adjustable relative thereto, for supporting the gripping member. The connecting element includes a support shoe with connection eye for an insert which can be fixed therein, for receiving the support element in a pivotable manner and a clamping cover which can be screwed to the support shoe. The support shoe and clamping cover are provided with a longitudinal groove for receiving the support cable in a non-slip fashion.

22 Claims, 7 Drawing Sheets

APPARATUS FOR SUSPENDING AT LEAST ONE CURRENT-CARRYING CONTACT WIRE FOR CURRENT COLLECTORS OF OVERHEAD LINE BUSES OR TRAMS

BACKGROUND OF THE INVENTION

The invention concerns an apparatus for suspending at least one current-carrying contact wire for current collectors of overhead line buses or trams, with a mechanical connecting device, in particular a clamping device, which can be fixed to a support cable or the like elongate member, and a connecting element which is insulated relative to the support cable and to which is connected a gripping member for the contact wire.

A trolley or contact wire which is suspended in a point-like fashion at two support cables which cross at a spacing from each other the route of the overhead line bus—also referred to as a trolley bus—, the tram or like vehicle, forms generally a catenary curve. It extends horizontally in the middle between the two support points and rises progressively more steeply to the suspension points. The position of the contact wire is dependent on its specific tension and the distance between the two suspension arrangements.

When the contact wire is in rubbing contact with a trolley bus current collector or pantograph, the contact pressure of that sliding contact member urges the contact wire upwardly out of its rest position into what is referred to as its working position. The difference in height between the rest position and the working position is at its greatest in the middle of the span length of the cable and at the smallest at the support point, and it is dependent on the contact pressure of the sliding contact member, the span length, the specific tension of the contact wire, its cross-section, and the speed of the vehicle or sliding contact member.

The curve of the working position substantially corresponds to the rest position, that is to say, it is horizontal in the middle of the span length and at the steepest at the support point.

When now the sliding contact member slides along the working line, initially it is still in an almost horizontal configuration. Then, as the curve of the contact wire becomes progressively steeper, the sliding contact member must be accelerated upwardly more and more. However, there is a limit on that capacity for acceleration of the current collector, due to the mass inertia and the contact pressure involved. The sliding contact member can no longer follow the curve of the contact wire as it becomes progressively steeper, at higher speeds, comes away from the contact wire before reaching the support point, jumps over the support point and, after the support point, hits against the contact wire of the next span length. That springboard effect which occurs in relation to rigidly suspended contact wires can be easily noted due to the presence of sparks just before and after the suspension point.

That jump-off effect is further promoted by a contact wire wave which the current collector pushes along in front of it. It is reflected at the fixed suspension point and further contributes to throwing the current collector off in a downward direction. Besides radio interference, this phenomenon of the current collector jumping off the wire gives rise to weld beads in particular at the point of impingement and also results in increased mechanical wear of the contact wire. The weld beads in turn have a damaging effect on the sliding contact member.

The foregoing problems have been substantially alleviated by virtue of an elastic suspension configuration. Such apparatuses, of the general kind set forth above, with a ceramic insulating body between clamps which embrace the support cable, and a parallelogram-like suspension arrangement, are described in Swiss patent specification No 207 177 as an addition to Swiss patent specification No 195 513 to the present applicants. This known suspension arrangement comprises a pair of elongate suspension members and two yoke-like transverse elements which are connected by same and of which one affords clamps for the contact wire. The yoke which is near the cable is rigidly connected to the insulating body. The insulating body which is mounted in a bell-like metal hood with lateral plates and from which a screw pin projects downwardly is also to be found in Swiss patent specification No 186 137. In addition Swiss patent specification No 229 346 discloses a swing curve holder which is provided with the insulating body and in which a cantilever arm which presses towards the end against the support cable adjoins the metal hood of the insulating body.

If, in accordance with above-mentioned Swiss patent specification No 195 513, the contact line is laid along a straight line in a zig-zag configuration (maximum contact wire angle in a straight line of 2½°), then two force components occur at the suspension point. One of the force components is the weight of the contact wire, which is dependent on the span length, while the other is the curve tension which is dependent on the contact wire angle and the tension in the contact wire. If now the contact wire or contact line is suspended at the support point by means of a swing member, then, in accordance with those two components, that member will adopt a certain inclined position.

If the contact pressure of the sliding contact member changes the vertical component even only by a small amount, then the inclination of the swing member—and therewith also the height of the contact wire at the suspension point—is also immediately altered.

If the sliding contact member moves towards the support point, the contact pressure of the current collector increasingly takes over a part of the weight of the contact wire as it approaches the support point, that is to say the vertical weight component on the swing member is reduced, the swing member takes up a flatter position, and the contact wire is raised from the lower rest position into the upper working position at the support-point. The sliding contact member now comes entirely into the vicinity of the support point where the contact wire rises at its steepest. In order to remain on the contact wire, the current collector would have to accelerate upwardly very considerably, which is not possible when operating at higher speeds, by virtue of its mass inertia. The above-mentioned springboard effect would now occur, in the case of a rigid contact wire.

If now however the sliding contact member were to jump off the contact wire here, the contact pressure would naturally have to fall to zero beforehand. In such a situation, the vertical component would immediately become greater and greater at the swing member, that is to say the swing member becomes steeper and the suspension point moves downwardly. If therefore the sliding contact member can no longer cope with the rise in the contact wire before the support point, the suspension point with the contact wire which was initially urged upwardly moves downwardly towards the sliding contact member and contact is ensured.

When the sliding contact member has passed the support point, it jumps on to the contact wire at the next span length with a certain amount of weight, depending on its mass and speed. That horizontal force is divided into two components. One is directed tangentially relative to the contact wire and is therefore harmless; the other is upwardly perpendicularly to the contact wire and, if the contact wire is suspended rigidly, after the suspension point, it causes severe wear thereof.

However, in the case of the above-mentioned elastically suspended contact wire, that upwardly directed force component results in a reduction in the vertical component of the swing member and consequently the swing member takes up a flatter position, the suspension point rises and the contact wire elastically absorbs the impact of the sliding contact. However that is only possible in the case of a contact wire suspension arrangement using an inclined swing member; if the swing members were to be disposed vertically, the contact pressure of the current collector would first have to overcome the entire weight of the contact wire in a span width before the suspension point rises or becomes elastic. The contact wire is caused to oscillate by virtue of the contact pressure of the sliding contact member and due to the lateral sway of the trolley bus.

The superiority of the elastic contact wire suspension arrangement relative to the rigid arrangement lies in the upward and downward oscillation movements of the swinging support points in dependence on the contact pressure. Therefore, by means of a wire parallelogram, it is necessary to ensure that the contact wire is perpendicular in any swing member position.

The above-mentioned zig-zag configuration of the contact wire does not have any adverse influence on current pick-up as the low forces which occur, due to the lateral acceleration of the current collector at the support point, are readily compensated by the swing member. In addition, that zig-zag configuration in conjunction with the inclined swing members provides for partial compensation of the variation in tension of the contact wire, which is caused by temperature. That effect occurs by virtue of the fact that, at different temperatures, both the inclined positioning of the swing members and also the contact wire angle at the support point alter, and therewith the distance from one suspension point to another.

The above-discussed so-called inclined swing members afford the following advantages:

uniform contact pressure of the current collector as a result of resiliency or yielding nature of the contact wire at the suspension points;

a high level of operational reliability and a low risk of derailment;

freedom from radio interference;

a long service life for the carbon sliding members of the current collector without the contact wires having to be lubricated;

almost no wear of the contact wire; long service life and a saving on copper;

partial compensation for thermal expansion of the contact wire, that is to say the difference in tension;

possibility of using maximum span lengths of up to 35 meters in straight lines and thus a lower level of need for support masts;

lower maintenance costs and therefore greater operating economy; and permitting very high speeds of travel, particularly in bends and curves, and an increase in economy of operation due to higher journey speeds.

Against the advantages of the swinging suspension arrangement, there is the disadvantage that the known swing member suspension arrangements are susceptible to wear in the region of their ceramic insulating bodies; the latter are highly sensitive to forces acting thereon from the outside.

SUMMARY OF THE INVENTION

In consideration of those factors the inventor set himself the aim of improving an apparatus of the kind set forth in the opening part of this specification, avoiding the deficiencies found therein, and in particular increasing the service life of the swing suspension arrangement. The invention seeks to provide that these novel suspension arrangements are in particular suitable for contact wires of overhead line buses or trams, but possibly also for the contact wires of other forms of transport.

That object is achieved by an apparatus for supporting at least one current-carrying contact wire from a support cable wherein the contact wire contacts the current collectors of an electrical vehicle which comprises clamping means secured to the support cable for suspending a gripping member for supporting the at least one current-carrying contact wire, said clamping means having a clamping cover and a support shoe each formed of an electrical insulating material and means for securing the support cable between the clamping cover and the support shoe, said support shoe having receiving means for pivotally receiving support means for carrying the gripping member, said receiving means comprises a connection eye for receiving insert means for pivotably securing the support means to support the shoe.

In accordance with the invention, the connecting element is formed from an insulating plastic material—possibly also a metal encased with the plastic material—and forms a unitary shaped body with at least a part of the connection device, which shaped body has a receiving means or mounting for a support element of the gripping member, which support element is adjustable relative to the shaped body. Therefore, instead of the susceptible ceramic insulator in the metal housing, this arrangement now has a shaped or molded body—preferably comprising a polyamide with glass fiber reinforcement—which performs three functions, namely on the one hand the function of providing insulation and on the other hand simultaneously providing for non-slip fixing and pivotal connection to the actual suspension members.

A connecting element according to the invention includes a support shoe with connection eye for a preferably metallic insert of the support element, as a pivot location, and a clamping cover which can be screwed to the support shoe; the support shoe and/or the clamping cover is/are provided with a longitudinal groove for the support cable which can be inserted therein.

Another configuration of the connecting element, which is intended for swing member curve holders, has a clamping head portion with a longitudinal groove or grooves and clamping shells or straps for the support cable, and a free arm which is formed on the clamping head portion at an out-of-center position in the longitudinal direction, with at least one connection eye for a projecting portion on the support element, which is rotatable about a transverse pin passing through the arm and the projection, parallel to the arm, and can be fixed by tightening the transverse pin.

It is in accordance with the invention that a pin-like member of the transverse element which is near the support cable—being a yoke bar—can be fitted into the connection eye of the connecting element, that is to say the support shoe or the clamping head portion, and fixed by a fixing screw or a suitable fixing device. By virtue of that arrangement, the position of the yoke bar which carries the elongate suspension members of the parallelogram or individual suspension bars can be adjusted and fixed relative to the connecting element which provides the connection eye, and thus relative to the support cable. Releasing the adjusting screw makes it possible to arrive at a fresh setting for the suspension arrangement, at any time.

Particularly fine adjustment is achieved by an adjusting screw being mounted on the clamping head portion or the free arm thereof and at a spacing relative to the pivot location formed by the connection eye and the pin-like member, which adjusting screw can press adjustably against an abutment or stop on the yoke bar. It will be appreciated that the adjusting screw can be carried on the yoke bar and the stop or abutment on the clamping head portion.

Particularly in regard to the yoke bar of the swing member curve holder, it has been found desirable for the support element to be provided—like the arm of a weighing machine or balance—with two hook-shaped free ends for carrying the ends of the elongate suspension members. In the case of the suspension arrangement in accordance with Swiss patent specification No 207 177 the elongate suspension members are passed directly through eyes in the curved suspension member in that arrangement, and then worked to form eyes on the suspension member. The simplification in assembly achieved by the present invention will be apparent.

Tubular end or angle connectors of metal, in particular light metal or alloy, according to the invention, are particularly suitable more especially for the above-mentioned hook-like ends but also for holding eyes of a different configuration on the yoke bars, which connectors are carried at each end of an elongate member of insulating material, the end or angle connector having a hinge or pivot pin as the connection member.

It will be appreciated that other sleeve shapes or grommets can also be used here.

In accordance with a further feature of the invention the pivot location between the support shoe or clamping head portion and yoke bar is provided with an insert comprising material which is harder than the connecting element, preferably metal; the insert is cast into the support shoe or the arm of the clamping head portion. The insert is prevented from rotating by a polygonal portion in the region of the support shoe or the arm, or by means of at least one retaining means, preferably a segment-shaped portion.

Desirably, the opening in the insert which extends transversely to the suspension direction tapers conically inwardly to a cylindrical bore as a continuation for guiding the fixing screw for the pivot location. That opening is open in the suspension direction—that is to say facing downwardly— and increases in size in a downward direction.

The projection on the yoke bar, which is to be inserted into the opening, is a conical pin or peg through which the adjusting screw engages and which therefore has a central opening. The conical pin is a shaped part of the yoke bar with cranked arms which project radially relative to the conical pin and which end in eyes as holding eye configurations.

In accordance with the invention, in one configuration the conical pin is part of a support portion which is of U-shaped configuration in cross-section and which approximately centrally engages with one arm under the support shoe; that arm then carries a downwardly directed screwthreaded pin or the like connection member.

Another embodiment has a pin-like connection element which can be introduced into the lower aperture of the conical opening and is to be fixed by means of the adjusting screw.

A suspension harness can also be mounted on the support shoe or clamping holder; for example, in one construction, the support shoe is covered in the region of the insert by plate-like connecting elements of a holder which carries the suspension harness.

It has been found particularly advantageous for the suspension harness to be adapted to be rotatable on the support shoe at least about one axis. In accordance with a further feature of the invention the suspension harness may carry an adjusting rail, which extends transversely with respect to the support cable, for clamping devices in each of which a respective contact line or wire can be clamped. In a similar manner, for example in the case of a feeder arrangement, two contact lines or wires—wire cables or like elongate members—can be mounted to a transverse head portion of the suspension harness, more specifically at two clamping locations.

In accordance with the invention, there is provided a support shoe with clamping cover for conventional swing member suspension arrangements and a clamping holder with cantilever member and eccentric arm in particular for swing member curve holders. Both configurations are formed or molded from the described insulating plastic material which can carry a load—both as very flat or shallow bodies, the width of which is preferably less than 50 mm.

In regard to the support shoe it should also be emphasised that, on each side of a line of symmetry which passes through the axis of the conical opening, it has a respective wing-like portion and both provide the top side for bearing against a support cable; a clamping cover is screwed on to said top side and the support cable is held in a non-slip fashion in that way. For the sake of better adaptation, the top side is curved downwardly towards its end edges.

By virtue of the invention there is provided a durable connection which nonetheless is easy to assembly between the support cable and the contact wire or line, with the particular advantage that the entire range of use of the fixing options for current-carrying overhead lines which run over public routes can be covered by essentially two configurations of the clamping holder.

BRIEF DESCRIPTION OF THE DRAWINGS

Further advantages, features and details of the invention will be apparent from the following description of preferred embodiments and with reference to the drawings in which.

DETAILED DESCRIPTION

A support cable 10 is stretched between two fixed points which are not shown in the drawing, for example building walls or masts, the support cable 10 passing over the route of an overhead line or trolley bus or the rails of a tram.

Figures 1, 2:
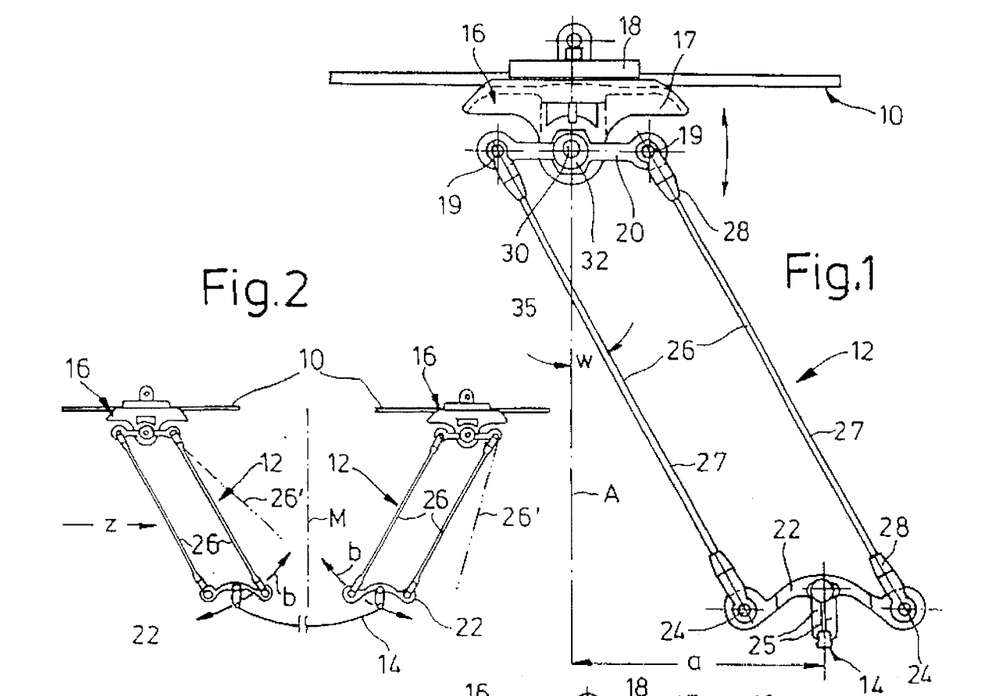
FIG. 1 is a side view of a swing member suspension arrangement for a contact wire of overhead line buses or like vehicles, the suspension arrangement having a clamping holder with support shoe and clamping cover and also having a yoke bar.
FIG. 2 shows a portion from a section of the contact wire with two swing suspension arrangements which are inclined in opposite relationship.

Fixed to the support cable 10 in FIG. 1 is a swing member suspension arrangement 12 for a contact wire 14, against which slides a current collector (not shown) of the trolley bus or like vehicle. The swing member suspension arrangement 12 has a clamping holder 16 which is fixed to the support cable 10 in a non-slip fashion and which comprises a support shoe 17 and a clamping cover 18 that is associated therewith from above—both being formed from tough insulating material—, a yoke bar 20 which is mounted adjustably on the clamping holder 16 and which is made of metal in a dumbell-like configuration with two holding eyes 19 at its ends, and, at a spacing from the yoke bar 20, a curved member 22 which extends substantially parallel to the yoke bar 20. The member 22 in turn has two holding eyes 24 at its ends, which are connected to the holding eyes 18 of the yoke bar 20 adjacent the support cable 10 by elongate suspension members 26. The latter are mounted adjustably in the holding eyes 18, 24, preferably at an angle w of about 30° relative to a vertical line, by means of end connectors 28, of which each two, together with an elongate member 27 of insulating material or metal wire, form the suspension member 26. The end connector 28 can be in the form of a light metal or alloy sleeve with a conical portion towards the suspension member, and may have a pivot pin 29a which is held by pivot jaws and which passes releasably through a holding eye 18, 24. The yoke bar 20, the member 22 and the two elongate suspension members 26 thus form a parallelogram with a degree of deflection as indicated at a between the contact wire 14 and the vertical line A through an adjusting or mounting screw 30 which passes centrally through the support shoe 17.

Figure 3:
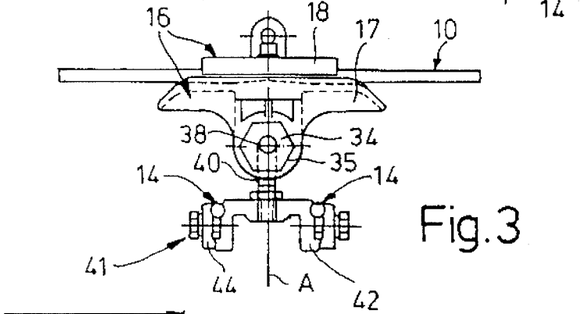
FIG. 3 shows an embodiment which is modified in relation to FIGS. 1 and 2 of a clamping holder for a so-called feeder suspension arrangement in straight contact wire sections.

The yoke bar 20 has a conical projection or pin 32 formed or molded centrally thereon, which engages into an opening 33 which correspondingly tapers in an inward direction (see FIG. 8) as a connection eye of the support shoe 17, and passing through the conical pin 32 is the screw 30, by means of which it can be fixed to the clamping holder 16 in a condition of being adjusted in any desired position, that is to say in FIG. 1 approximately parallel to the support cable 10. The tapering opening 33 is arranged in a metal insert 34 which is non-rotatably cast into the material of the support shoe 17. In FIGS. 1 and 3, a polygonal edge 35 of the insert 34 which extends transversely to the support cable 10 can be seen at the outside surface of the support shoe 17.

The contact wire 14 is fixed between two clamping jaws of the curved member 22 in such a way that the larger part of its periphery is exposed, for contact with the above-mentioned current collector. The clamping jaws 25 are in turn pivotable and adjustable relative to the curved member 22.

FIG. 2 diagrammatically shows a contact wire portion 14 between two swing member suspension arrangements 12 which are inclined in opposite relationship, more specifically when viewing the contact wire 14 in the direction of the axis thereof. The middle of the contact wire is indicated at M, while reference numeral 26' denotes the deflection of the elongate suspension members 26 towards the right if it is assumed that there is a wind blowing in the direction indicated by the arrow Z, in which case the left-hand curved member 22 is lifted and the right-hand curved member 22 is lowered.

The arrows b show the direction of swing or movement of the two successive suspension arrangements 12. When the contact wire 14 is caused to oscillate, the oscillations are damped to a stop within a short time as the directions of movement of the suspension arrangements 12 are directed through about 90° in opposite relationship to each other.

FIG. 3 shows a clamping holder 16 for a pair of contact wires 14. In this case, instead of having a tapering opening, the metallic insert 34 which is non-rotatably formed in the support shoe 17 is provided with a central passage for a transverse pin 38. The pin 38 passes through a harness pin 40, which extends along the vertical line A, of a suspension harness 41. That assembly serves as a feeder suspension arrangement for straight sections; here, two contact wires 14 are mounted on each side of a transverse head portion 42, with respective clamping jaws 44 clampingly pressing against the contact wires 14 at each end of the transverse head portion 42.

In order economically to suspend a trolley bus contact wire 14, only a few support points are to be used at curves or bends, that is to say the contact wire angle must be as large as possible at the support points. That angle is rounded off to prevent harmful lateral impacts of the current collector against the contact wire 14; the head of the contact wire 14 is clamped in two elastic curved rails or bars whose length depends on the contact wire angle. The curved rails or bars are also suspended by way of a parallelogram swing arrangement on the support cable 10 or transverse span wire and are indicated in cross-section at 51 in relation to the swing member curve holder 50 in FIG. 4.

Figure 4:
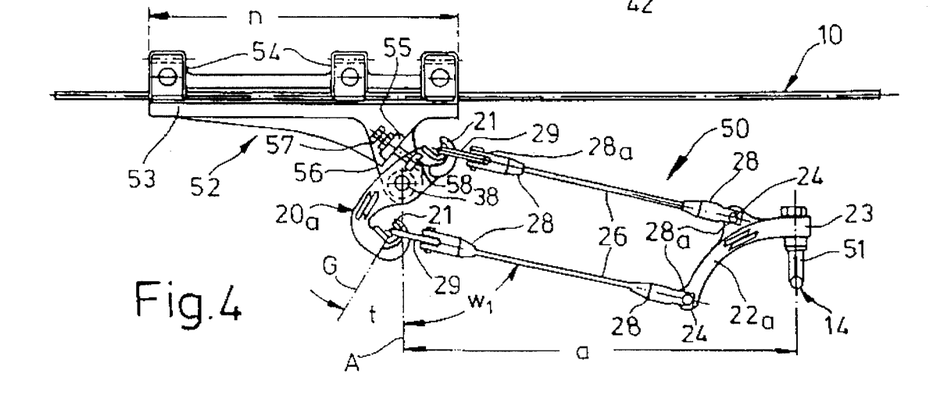
FIG. 4 is a side view of a swing member curve holder.
Figure 31:
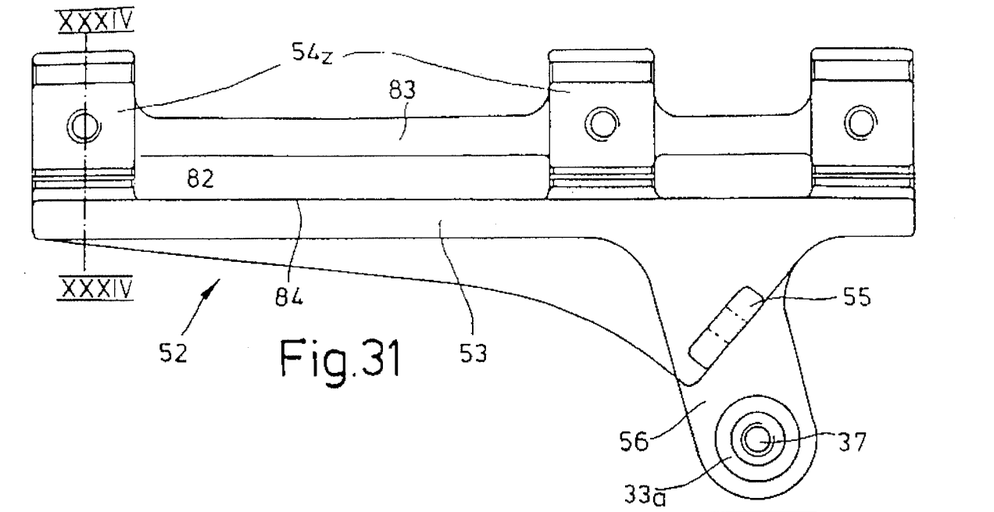
FIG. 31 is a side view on an enlarged scale of a part of the clamping holder shown in FIG. 4.
Figure 32:
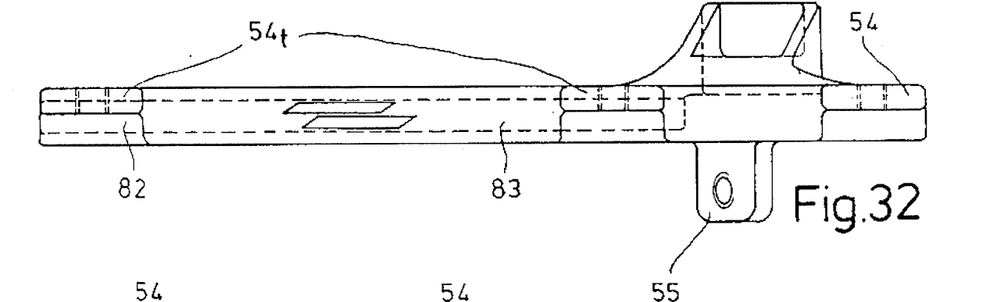
FIG. 32 is a plan view of FIG. 31.
Figures 33, 34:
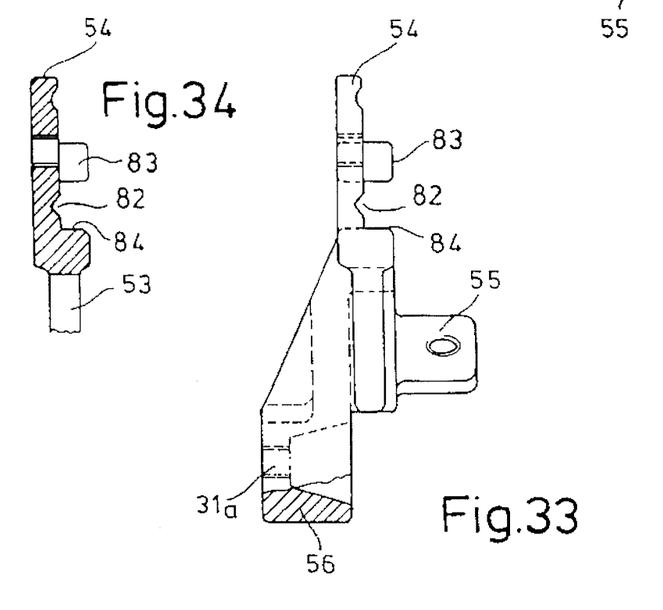
FIG. 33 is a front view of the structure shown in FIGS. 31 and 32.
FIG. 34 is a view in section through FIG. 31 taken along line XXXIV—XXXIV therein.
Figure 35:
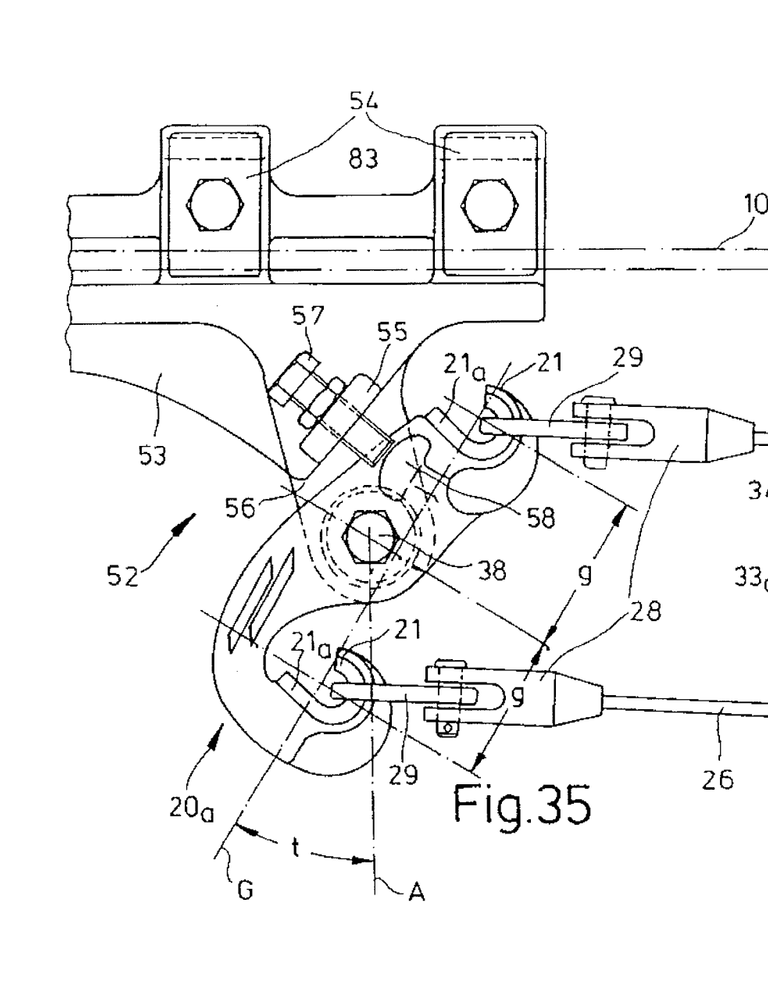
FIG. 35 is a view on an enlarged scale of a part of the clamping holder shown in FIG. 4.

The curve holder 50 is fixed to the support cable 10 by means of a clamping holder 52 which is also formed or molded from insulating material; towards the cable the clamping holder has a comparatively long clamping head portion 53 (length n of 340 mm in this case), through which the support cable 10 passes and which is fixed to same by clamping shells or straps 54. A free arm 56 which projects downwardly in FIG. 4 is formed or molded on the clamping head portion 53 in eccentric relationship, with a central opening 33*a* (see FIGS. 31 and 33). In the region thereof is a transverse pin 38 for a balance arm-like yoke bar 20*a* with hooked ends 21 for receiving eyes 29 on the end connectors 28.

A straight line G through the ends 21 of the yoke bar 20*a* includes relative to the vertical line A an angle t of about 30°, which can be adjusted by means of an adjusting screw 57 which is rotatably fixed in a projection 55 on the clamping head portion 53; the free end of the adjusting screw 57 bears against an abutment or stop 58 on the yoke bar 20*a*. The angle wl between the vertical line A and the elongate suspension members 26 measures about 100° in this case and the contact wire 14 is held by those curve bars or rails 51, as a clamping assembly, which is provided outside the parallelogram on the yoke bar 20*a*, elongate holding members 26 and curved member 22*a*, on a lateral extension portion 23 of the member 22*a* which is here of a curved configuration.

The design configuration of the support shoe 17 which forms a pivot mounting location, being of a height h of for example 75 mm and comprising insulating plastic material, can be seen from FIGS. 5 through 9, wherein in this case also the line A is a line of symmetry passing through the middle of the side view of the support shoe 17. Projecting on each side thereof is a wing-like portion 60; formed in the top side 61 thereof, of a width e of for example 38 mm and a length f of 170 mm, is a longitudinal groove 62 which drops away to the end edges 61*a*, being of a width i of 14 mm in this case, for receiving the support cable 10. Disposed on both sides of the longitudinal groove 62 in lateral enlargement portions 63 of the support shoe 17 are blind holes 64 with metal screw sleeves 64*a* formed therein, for clamping screws 65 of the clamping cover 18. Shaped ribs 66 are produced at the surface, by molded recesses; with the appropriate material all wall thicknesses q are at most about 5 mm.

Figures 5, 6, 8:
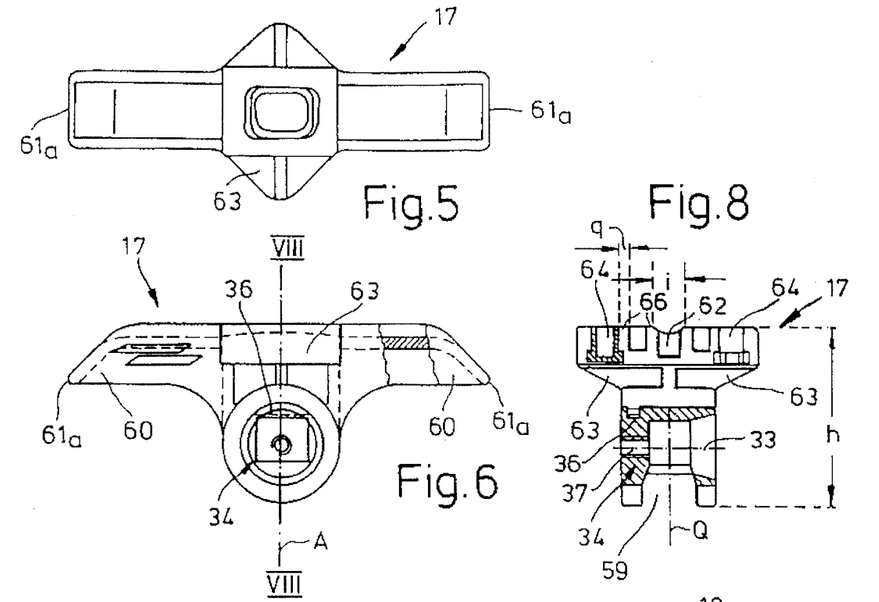
FIGS. 5 through 7 are a view from below, a side view and a plan view of the support shoe of FIG. 1, on an enlarged scale.
FIG. 8 is a view in section through FIG. 6 taken along line A therein.
Figure 7:
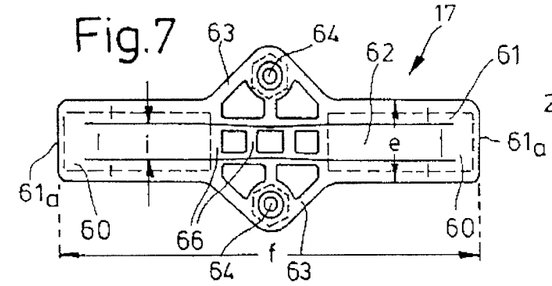

In the embodiment shown in FIG. 6 the edge circumference of the metal insert 34 is circular; a segment incision or notch 36 provided therein also provides for a non-rotatable fit for the insert 34; the groove-like segment incision or notch 36 can be particularly clearly seen in FIG. 8 and, upon manufacture of the support shoe 17, accommodates a part of the material thereof, which hardens to form the rib.

Figure 9:
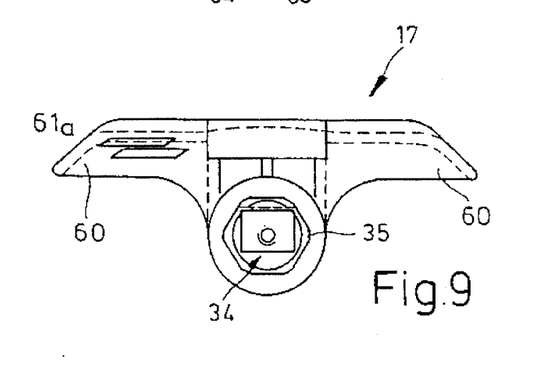
FIG. 9 is a side view of another support shoe.
Figures 10, 11:
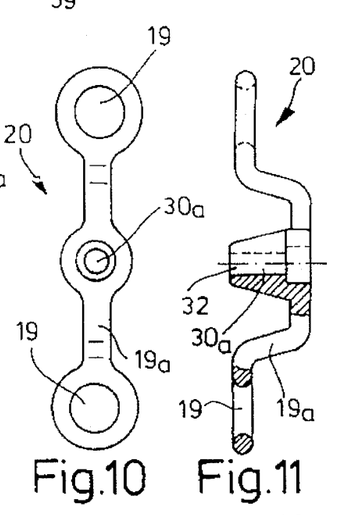
FIGS. 10 through 12 are a plan view, a partly sectional side view and an end view of the yoke bar.
Figure 12:
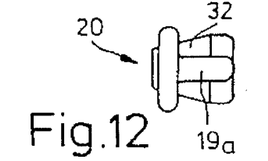

In the embodiment shown in FIG. 9, the non-rotatable fit is produced, in the manner already described with reference to FIG. 1, by a generally polygonal edge contour 35 for the insert 34.

Figure 18:
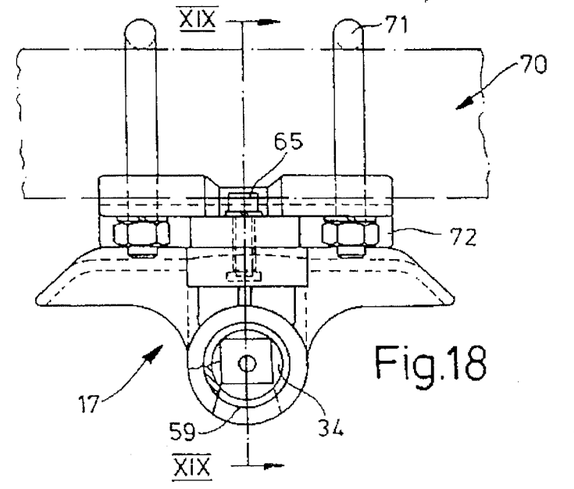
FIG. 18 shows a side view of a cantilever tube with support shoe fixed thereto.

FIG. 8 in particular shows the metal insert 34 with the opening 33, which opens downwardly at 59 and which tapers towards the center line Q of the cross-section, for receiving the conical pin 32 of the yoke bar 20 shown in FIGS. 10 through 14, as well as the cylindrical opening 37 in the insert 34 for the screw 30 which engages through a central aperture 30*a* in the yoke bar 20. Adjoining the conical pin 32 at both sides thereof on the round steel portion are cranked arms 19*a*, the ends of which are bent to form eyes. FIG. 18 clearly shows that the lower aperture 59 of the opening 33 in the metal insert 34 enlarges conically downwardly.

Figures 13, 14, 15, 16, 17:
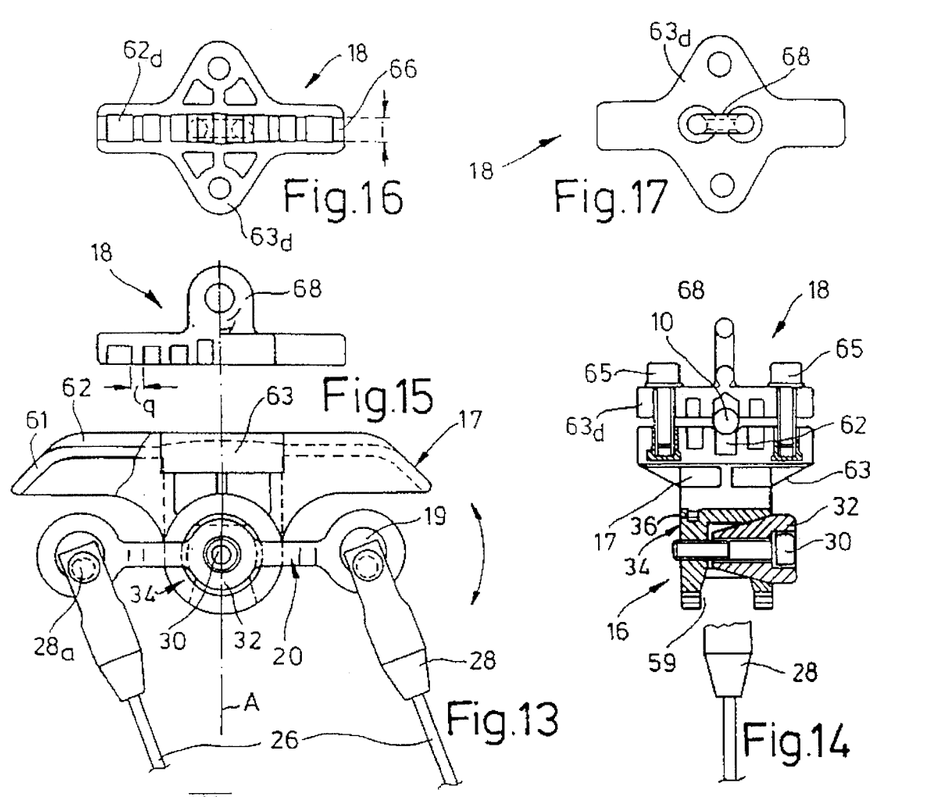
FIG. 13 is a detail on an enlarged scale from FIG. 1 with a partly sectional support shoe.
FIG. 14 shows the section through FIG. 13 along line A therein, with a clamping cover which is screwed on the support shoe.
FIGS. 15 through 17 show a partly sectional side view, a view from below and a plan view of the clamping cover.

The clamping cover 18 is also provided with a longitudinal groove 62*d*, even if it is shallower, and with lateral enlargement portions 63*d*, as well as with a pulling eye 68.

Figure 19:
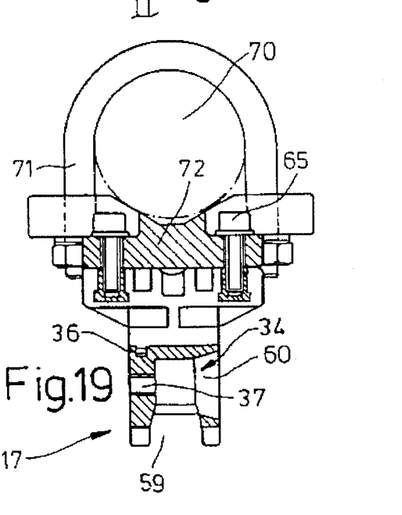
FIG. 19 is a view in section through FIG. 18 taken along line XIX—XIX therein.
Figure 20:
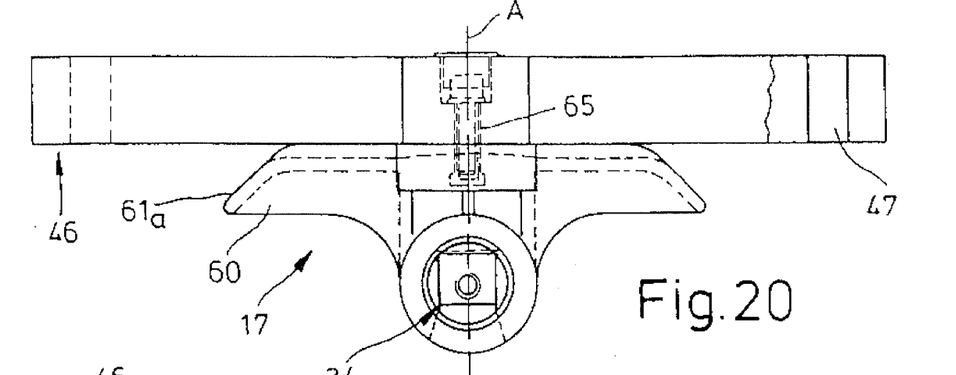
FIGS. 20 and 21 are a side view and a plan view of a support shoe with insulating strip.
Figure 21:
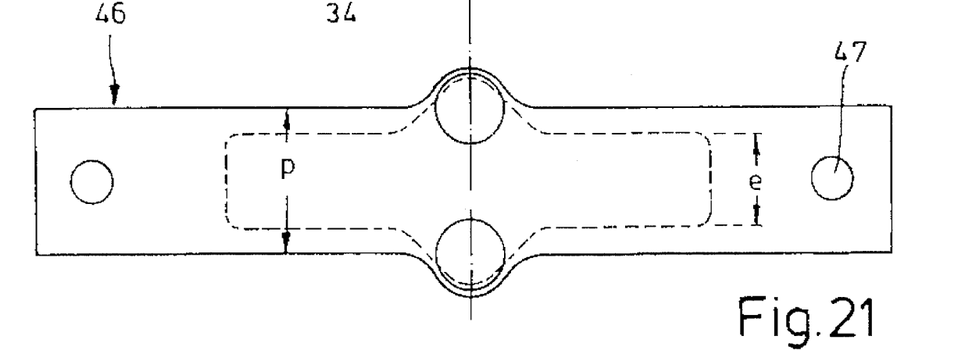
Figure 22:
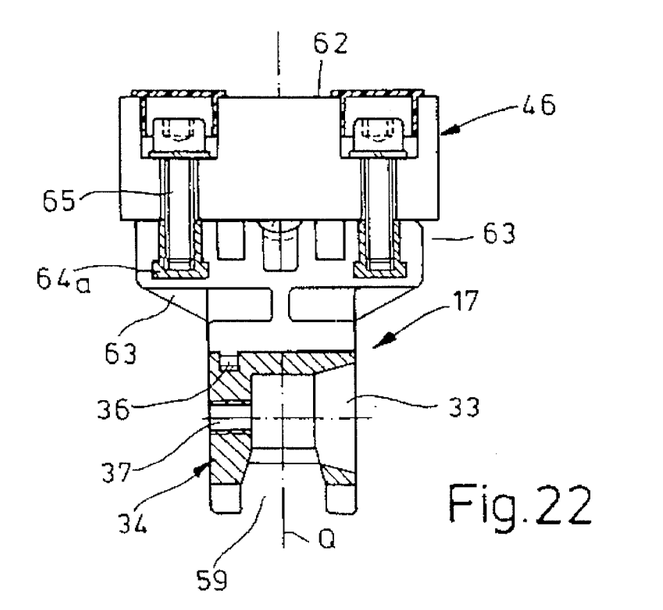
FIG. 22 is a view on an enlarged scale through FIG. 20 taken along line A therein.

In FIGS. 18 and 19, connected to the support shoe 17 by stirrup bolts 71 is a cantilever tube 70 which holds the support shoe, the bolts 71 passing through a special flat cover 72; the latter replaces the above-described clamping cover 18 and, like same, is connected to the support shoe 17 by clamping screws 65.

An insulating strip 46 of a width y of 50 mm is screwed to the support shoe 17 in FIGS. 20 through 23 so that the latter can be for example fixed to the roof of a building. Openings 47 are provided in the insulating strip 46 for that purpose.

Figures 23, 24, 25, 26, 27, 28, 29, 30:
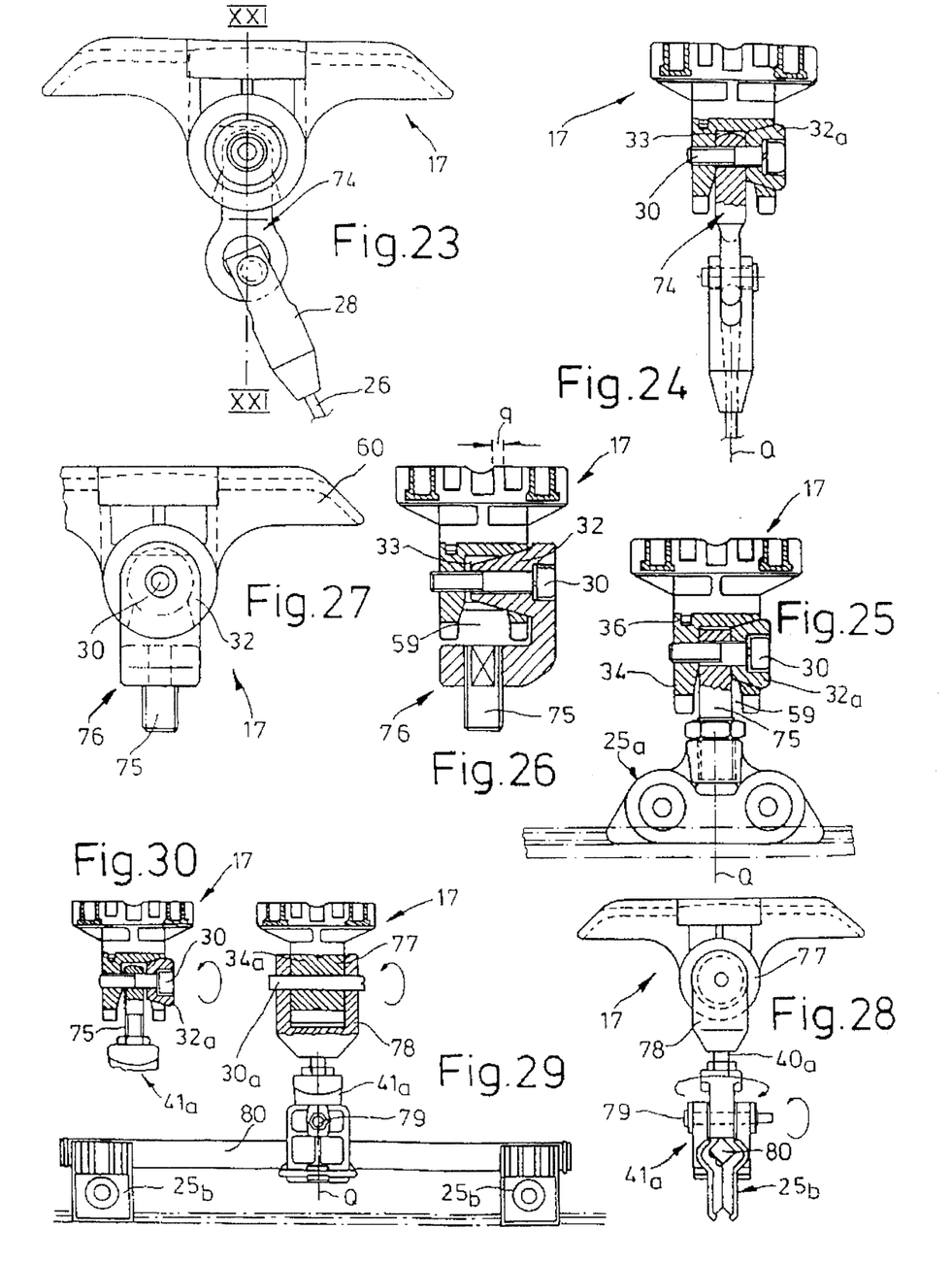
FIG. 23 is a side view of a support shoe for an individual suspension arrangement.
FIG. 24 is a view in section through FIG. 23 taken along line XXIV—XXIV therein.
FIGS. 25 and 26 are views in cross-section through support shoes for an individual suspension arrangement.
FIG. 27 is a side view of part of the FIG. 26 structure.
FIG. 28 is a side view of the support shoe of a clamping holder with single trolley bus swing member for a straight part.
FIG. 29 is a sectional front view of the FIG. 28 structure.
FIG. 30 is another configuration of a portion from FIG. 29.

In the case of an individual suspension arrangement as shown in FIGS. 23 and 24, a support eye 74 for an elongate suspension member 26 is inserted from below into the opening 59 and is held there by the adjusting or mounting screw 30 which passes through same. Reference numeral 32 identifies a conical pin or projection which embraces the screw 30 in a nut-like fashion and simplifies tightening same.

FIG. 25 shows a rigid individual suspension arrangement with clamping shoe 25*a* on a pin, through which the mounting screw 30 passes, as the connection element 75, on the cross-section center line Q.

FIGS. 26 and 27 also show such a connection element 75, here as part of a support portion 76 which is generally of a U-shaped configuration in cross-section and which has a conical projection or pin 32 formed thereon, with which it can be inserted from the exterior into the conical opening 33.

The central portion 77, which contains a bush insert 34*a*, of a support shoe 77 for trolley bus single swing members in straight sections, as shown in FIGS. 28 and 29, carries a U-shaped holder 78, while a harness 41*a* is rotatable about the central pin 40*a* of the U-shaped holder 78, which is provided on the cross-section central line Q, as well as being pivotable about a transverse pin 79. The U-shaped holder 78 is connected to the bush insert 34*a* by a pin 30*a*. The harness 41*a* carries a transversely directed adjusting bar or rail 80 for clamping jaws 25*b* which are displaceable thereon. The harness 41*a* is suspended on the inside in the support shoe 17 as shown in FIG. 30, corresponding to the configuration shown in FIG. 25.

FIGS. 31 through 36 show the clamping holder 52 of the swing member curve holder 50 of FIG. 4, with scalloped support jaws 54*z* for the clamping shells or straps 54 to be screwed on, as well as with a conical opening 33*a* in the free arm 56 and a cylindrical opening 37 for the transverse pin 38. The clamping shells or straps are not shown in FIGS. 31 and 32. In this case the support cable 10 extends in a groove or channel 82 between an upper rib 83 and a lower shoulder step 84. A conical projection 32 on the yoke bar 20a is mounted in the opening 33a in the free arm 56 and can be held and fixed in position there by the transverse pin 38. As already mentioned in relation to FIG. 4, the clamping screw 57 performs the function of adjusting the angle t between the vertical line A and the straight line G through the free tips of the metal facings or linings 21a of the hook ends 21 of the yoke bar 20a. The receiving channels or grooves of the hook ends 21 are arranged at the same center-to-center spacings q relative to the transverse pin 38 and open in the same direction.

Figures 36, 37:
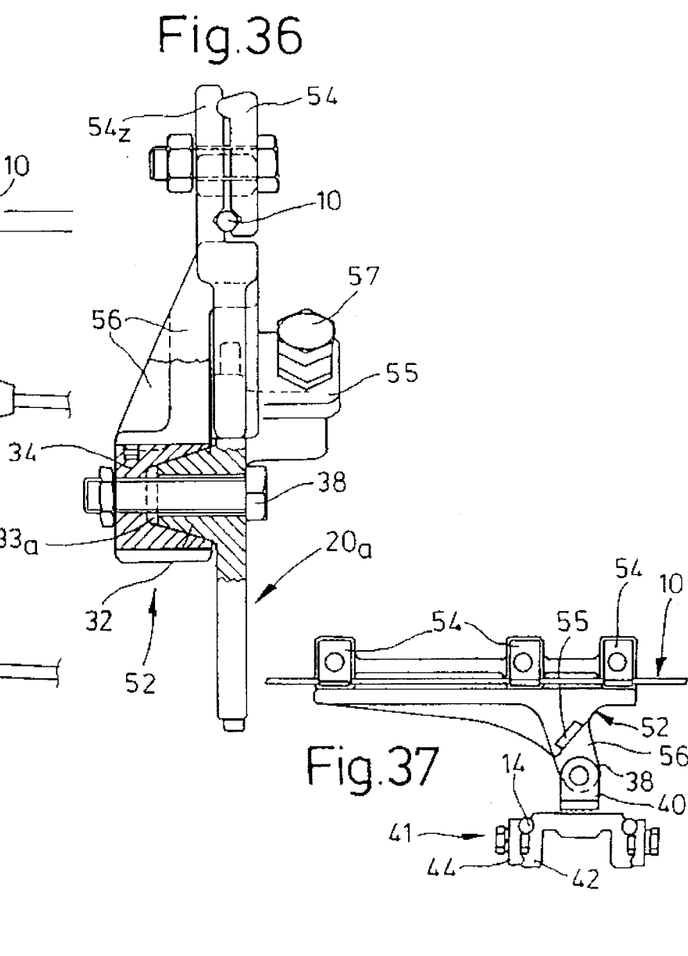
FIG. 36 is a partly sectional front view of the FIG. 35 structure.
FIG. 37 is a side view of the clamping holder shown in FIG. 4, in a configuration for a so-called feeder suspension arrangement in curves.

Finally FIG. 37 shows a clamping holder 52 in conjunction with a suspension harness 41 for a feeder suspension arrangement (see also FIG. 3).

The material used for the shaped or molded bodies 17, 18, 20a, 52 is preferably a polyamide 6, 6 with an approximately 50% reinforcement in the form of long glass fibers. That material has—conditioned dry, mechanical values at 23°— for example the following properties:

| Property | DIN | Unit | Value |
|---|---|---|---|
| (a) Density | 53479 | g/cm$^3$ | 1.57 |
| (b) Water absorption (24 h) | 53495 | % | 0.4 |
| (c) Shore hardness | 53505 | D | 87 |
| (d) Tensile strength | 53455 | MPa | 200 |
| (e) Elongation | 53455 | % | 3 |
| (f) Flexural strength | 53452 | MPa | 320 |
| (g) Modulus of elasticity | 53452 | GPa | 12 |
| (h) Impact strength | — | kJ/m$^2$ | 11 |
| (i) Melting point | — | °C. | 263 |
| (k) Dielectric constant | — | at 50 Hz | 4.1 |
| (l) Spec. insulation resistance | — | Ohm m | 1013 |
| (m) Tracking current resistance | — | KC Volt | 600 |

We claim:

1. An apparatus for supporting at least one current-carrying contact wire from a support cable wherein the contact wire contacts the current collectors of an electrical vehicle comprises:

clamping means secured to the support cable for suspending a gripping member for supporting the at least one current-carrying contact wire, said clamping means having a clamping cover and a support shoe each formed of an electrical insulating material and means for securing the support cable between the clamping cover and the support shoe, said support shoe having receiving means for pivotally receiving support means for carrying the gripping member, said receiving means comprises a connection eye for receiving insert means for pivotally securing the support means to the support shoe, wherein the support member comprises a parallelogram-like suspension assembly comprising a pair of opposed elongate suspension members and two opposed yoke-like transverse elements which are connected by the suspension members wherein one of the transverse elements carries the gripping member, the other of the transverse elements which is near the support cable comprises a yoke bar inserted with a member into the connection eye of the receiving means, wherein the yoke bar has two free ends for receiving respective ends of the elongate suspension members, wherein the elongate suspension members are formed of insulating material, and wherein the elongate members of insulating material have at both ends tubular end connectors of metal having conical portions connected to the yoke bar.

2. An apparatus for supporting at least one current-carrying contact wire from a support cable wherein the contact wire contacts the current collectors of an electrical vehicle comprises:

clamping means secured to the support cable for suspending a gripping member for supporting the at least one current-carrying contact wire, said clamping means having a clamping cover and a support shoe each formed of an electrical insulating material and means for securing the support cable between the clamping cover and the support shoe, said support shoe having receiving means for pivotally receiving support means for carrying the gripping member, said receiving means comprises a connection eye for receiving insert means for pivotally securing the support means to the support shoe, and wherein the connection eye is formed of an insert of a material which is harder than the insulating material of the support shoe.

3. An apparatus according to claim 2 wherein the insert is cast into the support shoe.

4. An apparatus according to claim 3 wherein the insert has a polygonal portion in the region of the support shoe.

5. An apparatus according to claim 4 wherein the insert has at least one retaining means in the form of a segment incision.

6. An apparatus according to claim 2 wherein the connection eye in the insert tapers conically in an inward direction and forms a cylindrical bore for an adjusting screw.

7. An apparatus according to claim 6 wherein the connection eye enlarges conically in a downward direction.

8. An apparatus according to claim 2 wherein the support shoe is covered in the region of the insert by plate-like connecting elements which carry a suspension harness.

9. An apparatus for supporting at least one current-carrying contact wire from a support cable wherein the contact wire contacts the current collectors of an electrical vehicle comprises:

clamping means secured to the support cable for suspending a gripping member for supporting the at least one current-carrying contact wire, said clamping means having a clamping cover and a support shoe each formed of an electrical insulating material and means for securing the support cable between the clamping cover and the support shoe, said support shoe having receiving means for pivotally receiving support means for carrying the gripping member, said receiving means comprises a connection eye for receiving insert means for pivotally securing the support means to the support shoe, wherein the support member comprises a parallelogram-like suspension assembly comprising a pair of opposed elongate suspension members and two opposed yoke-like transverse elements which are connected by the suspension members wherein one of the transverse elements carries the gripping member, the other of the transverse elements which is near the support cable comprises a yoke bar inserted with a member into the connection eye of the receiving means, and wherein the member on the yoke bar is a conical pin and wherein an adjusting screw engages the connection eye through the conical pin.

10. An apparatus for supporting at least one current-carrying contact wire from a support cable wherein the contact wire contacts the current collectors of an electrical vehicle comprises:

clamping means secured to the support cable for suspending a gripping member for supporting the at least one current-carrying contact wire, said clamping means having a clamping cover and a support shoe each formed of an electrical insulating material and means for securing the support cable between the clamping cover and the support shoe, said support shoe having receiving means for pivotally receiving support means for carrying the gripping member, said receiving means comprises a connection eye for receiving insert means for pivotally securing the support means to the support shoe, and wherein the support shoe is a suspension harness which is rotatable about at least one axis.

11. An apparatus according to claim 10 wherein the suspension harness has an adjusting bar for clamping devices, the adjusting bar extending transversely to the support cable.

12. An apparatus according to claim 10 wherein the suspension has two clamping locations for contact wires.

13. An apparatus for supporting at least one current-carrying contact wire from a support cable wherein the contact wire contacts the current collectors of an electrical vehicle comprises:

clamping means secured to the support cable for suspending a gripping member for supporting the at least one current-carrying contact wire, said clamping means having a clamping cover and a support shoe each formed of an electrical insulating material and means for securing the support cable between the clamping cover and the support shoe, said support shoe having receiving means for pivotally receiving support means for carrying the gripping member, said receiving means comprises a connection eye for receiving insert means for pivotally securing the support means to the support shoe, and wherein the support shoe has wing-like portions on both sides of a line of symmetry which passes through the axis of the connection eye, said wing-like portions provide a top side for contact against the support cable wherein the clamping cover is secured to the top side of the support shoe.

14. An apparatus for supporting at least one current-carrying contact wire from a support cable wherein the contact wire contacts the current collectors of an electrical vehicle comprises:

clamping means secured to the support cable for suspending a gripping member for supporting the at least one current-carrying contact wire, said clamping means having a clamping cover and a support shoe each formed of an electrical insulating material and means for securing the support cable between the clamping cover and the support shoe, said support shoe having receiving means for pivotally receiving support means for carrying the gripping member, said receiving means comprises a connection eye for receiving insert means for pivotally securing the support means to the support shoe, and wherein the support shoe has wing-like portions on both sides of a line of symmetry which passes through the axis of the connection eye, which wing-like portions provide a top side for a clamping cover which can be screwed on to the support shoe and which is provided with fixing elements for a support tube.

15. An apparatus for supporting at-least one current-carrying contact wire from a support cable wherein the contact wire contacts the current collectors of an electrical vehicle comprises:

clamping means secured to the support cable for suspending a gripping member for supporting the at least one current-carrying contact wire, said clamping means having a clamping cover and a support shoe each formed of an electrical insulating material and means for securing the support cable between the clamping cover and the support shoe, said support shoe having receiving means for pivotally receiving support means for carrying the gripping member, said receiving means comprises a connection eye for receiving insert means for pivotally securing the support means to the support shoe, and wherein the support shoe has wing-like portions on both sides of a line of symmetry which passes through the axis of the connection eye, the wing-like portions having a top side for bearing against an insulating strip.

16. An apparatus according to claim 15 wherein the top side has a longitudinal groove formed therein which is curved downwardly towards its end edges.

17. An apparatus for supporting at least one current-carrying contact wire from a support cable wherein the contact wire contacts the current collectors of an electrical vehicle comprises:

clamping means secured to the support cable for suspending a gripping member for supporting the at least one current-carrying contact wire, said clamping means having a clamping cover and a support shoe each formed of an electrical insulating material and means for securing the support cable between the clamping cover and the support shoe, said support shoe having receiving means for pivotally receiving support means for carrying the gripping member, said receiving means comprises a connection eye for receiving insert means for pivotally securing the support means to the support shoe, and wherein the support shoe has a free arm having at least one connection eye for receiving a projection on the support means which is adapted to be rotated and fixed, in parallel relationship with the arm, about a transverse pin which passes through the arm and the projection.

18. An apparatus according to claim 17 wherein the support shoe has a cantilever portion and the latter is formed as a clamping portion for the support cable.

19. An apparatus according to claim 18 wherein the support shoe and its cantilever portion are provided with at least one longitudinal groove and clamping straps.

20. An apparatus for supporting at least one current-carrying contact wire from a support cable wherein the contact wire contacts the current collectors of an electric vehicle comprises:

clamping means secured to the support cable for suspending a gripping member for supporting the at least one current-carrying contact wire, said clamping means having a clamping cover and a support shoe each formed of an electrical insulating material and means for securing the support cable between the clamping cover and the support shoe, said support shoe having receiving means for pivotally receiving support means for carrying the gripping member, said receiving means comprises a connection eye for receiving insert means for pivotally securing the support means to the support shoe, wherein the support member comprises a parallelogram-like suspension assembly comprising a pair of opposed elongate suspension members and two opposed yoke-like transverse elements which are connected by the suspension members wherein one of the transverse elements carries the gripping member, the other of the transverse elements which is near the support cable comprises a yoke bar inserted with a member into the connection eye of the receiving means, wherein a yoke bar having cranked arms which project radially from the conical pin and which terminate in eye configurations as holding eyes, and wherein the conical pin is part of a support portion which is of U-shaped configuration in cross-section and which engages with an arm of the support shoe.

21. An apparatus according to claim 20 wherein a connection element projects from the connection eye and is held therein by an adjusting screw which passes through a cone element.

22. An apparatus according to claim 20 wherein the support portion is non-rotatably fixed with an adjusting screw.

* * * * *